United States Patent Office 3,325,547
Patented June 13, 1967

3,325,547
STABILIZATION OF POLYOXYALKYLENE
COMPOUNDS
Thomas H. Cour and William L. Richmond, Austin, Tex., assignors to Jefferson Chemical Company, Inc., Houston, Tex., a corporation of Delaware
No Drawing. Filed Oct. 21, 1963, Ser. No. 317,797
8 Claims. (Cl. 260—611.5)

This invention relates to a method for the stabilization of polyoxyalkylene compounds against oxidation. More particularly, this invention relates to the stabilization of products having a molecular weight within the range of about 2,000 to about 5,000 prepared by condensing a triol with about 80 to 100 mol percent of propylene oxide and, correspondingly, from about 20 to 0 mol percent of ethylene oxide.

Comparatively high molecular weight triols prepared principally from glycerol and propylene oxide have found wide utility as raw material in the preparation of flexible polyurethane foams. However, for this purpose, it is necessary to provide a triol which is comparatively free from impurities and which has good stability against oxidative deterioration. For example, chemical breakdown resulting from oxidation may result in an increase in the saponification number of the triol, in the development of an "aldehydic" odor and the development of a bitter taste or in an increase in the propensity of the triol to discolor.

It has heretofore been proposed to overcome this problem through the incorporation into the polyether triol of a phenolic-type oxidation inhibitor. Although the results have been generally satisfactory, there is still much to be desired. In particular, it is desirable to minimize the amount of phenolic inhibitor incorporated into the polyether triol because of the rigid purity standards that are necessary for successful polyurethane foam manufacture.

In accordance with the present invention, a novel method for the stabilization of polyether triols of $C_3$ to $C_4$ triol alcohols has been discovered which permits the stabilization in the total absence of phenolic-type oxidation inhibitors or in the presence of reduced amounts of such inhibitors.

Briefly, in accordance with the present invention, a stabilizer selected from the group consisting of triethylenediamine, 2-methyltriethylenediamine, 2-ethyltriethylenediamine, and mixtures thereof with each other or with phenolic oxidation inhibitors, is added in an inhibiting amount to either the crude or finished polyether reaction product prepared by the condensation of the triol with 80 to 100 mol percent of propylene oxide and, correspondingly, 20 to 0 mol percent of ethylene oxide.

The triol to be stabilized in accordance with the present invention is prepared in conventional manner by base-catalyzed condensing the alcohols with an amount of propylene oxide or a mixture of propylene oxide with ethylene oxide sufficient to provide a polyether triol product having a molecular weight within the range of about 2,000 to about 5,000. As an example, a suitable triol may be prepared by initially reacting glycerol with an amount of propylene oxide to provide an intermediate product having a molecular weight within the range of about 300 to about 1,500. In order to prepare the final product, an appropriate base such as sodium hydroxide or potassium hydroxide, etc., is added to the intermediate and an additional quantity of propylene oxide is charged sufficient to provide a final product having a molecular weight within the range of about 2,000 to about 5,000.

The reaction product at the end of the propylene oxide addition step will be basic and will normally contain solids which should be removed by filtration. It is normally desirable to neutralize the crude reaction mixture with an appropriate acid such as sulfuric acid, phosphoric acid, oxalic acid, etc., prior to filtration. The oxidation inhibitor of the present invention may be added subsequent to neutralization and either pior to or subsequent to filtration as desired. Normally, it will be desirable to add the inhibitors prior to filtration.

As another example, the polyoxypropylene triol prepared in the above-described manner may be further reacted under basic conditions with an additional quantity of either propylene oxide or ethylene oxide, or a mixture thereof, provided only that the ethylene oxide does not constitute more than about 20 mol percent of the total amount of alkylene oxide added to the glycerol. As further examples, glycerol may first be reacted with ethylene oxide and then with the desired amount of propylene oxide or the glycerol may be alkoxylated with a mixture of propylene oxide with the desired amount of ethylene oxide to provide a heteric polyoxyalkylene triol. As a still further alternate, the glycerol may be initially reacted with a heteric mixture of ethylene oxide with propylene oxide to provide an intermediate which is further reacted with propylene oxide to provide the final triol product.

The primary oxidation inhibitor of the present invention is triethylenediamine (diazabicyclo-(2.2.2)-octane), methyltriethylenediamine, ethyltriethylenediamine, or a mixture thereof. Normally, it will be desirable to use from about 0.01 to about 1 wt. percent of inhibitor based on the weight of the polyether triol. More preferably, from about 0.05 to about 0.5 wt. percent of the inhibitor will be employed.

In accordance with the further embodiment of the present invention, the inhibitor that is added in the above-described amounts is composed of about 25 to 75 wt. percent of one or more of the above-mentioned triethylenediamines and, correspondingly, from about 75 to about 25 wt. percent of a phenolic oxidation inhibitor.

The term "phenolic oxidation inhibitor" is well known to those skilled in the art and refers to oxidation inhibitors containing one or more phenolic hydroxy groups on the same or different aromatic nuclei wherein the phenolic hydroxy groups are hindered through the provision of one or more substituent groups in at least the ortho position with respect to the hydroxyl group to be hindered. Representative examples of phenolic oxidation inhibitors include compounds such as 2,6-ditertiary-butyl-para-cresol, 2,2'-methylene - bis(4-methyl-6-tertiary-butylphenol), thio-bis (4-methyl-6-tertiary-butylphenol), 2,2'-methylene-bis(4,6-ditertiary-butylresorcinol), para-hydroxyanisole, 2,6-ditertiary-butylphenol, 2-tertiary-butyl-para-cresol, 2-butyl-para-hydroxyanisole, 2,6-dibutyl-para-hydroxyanisole, 2,6-dimethyl-para-cresol, 2-methyl-6-isopropyl-4-methoxyphenol, 2-methyl-6-isopropyl-4-methoxyphenol, 2-methyl-6-isopropyl - 4 - ethoxyphenol, 2-methyl-6-tertiary-butyl-4-methoxyphenol, 2-methyl-6-secondary-butyl-4-methoxyphenol, 2-methyl-6-tertiary-amyl-4-methoxyphenol, 2-methyl-6-tertiary-hexyl-4-methoxyphenol, 2-methyl-6-tertiary-heptyl-4-methoxyphenol, 2-methyl-6-tertiary-octyl-4-methoxyphenol, 2-methyl-6-tertiary-butyl-4-ethoxyphenol, 2-methyl-6-secondary-butyl-4-ethoxyphenol, 2-methyl-6-tertiary-amyl-4-ethoxyphenol, 2-methyl-6-tertiary-amyl-4-ethoxyphenol, 2-methyl-6-tertiary-hexyl-4-ethoxyphenol, 2 - methyl-6-tertiary-butyl-4-propoxyphenol, 2-methyl-6-tertiary-amyl-4-propoxyphenol, 2-methyl-6-tertiary-butyl- 4-butoxyphenol, 2-methyl-6-tertiary-amyl-4-butoxyphenol, 2 - ethyl-6-tertiary-butyl-4-methoxyphenol, 2-ethyl-6-tertiary-amyl-4-methoxyphenol, 2-ethyl-6-tertiary-heptyl-4-methoxyphenol, 2 -propyl-6-tertiary-butyl-4-methoxyphenol, 2-propyl-6-tertiary-amyl-4-methoxyphenol, 2-butyl-6-tertiary-butyl-4-methoxyphenol, etc. Other satisfactory but not necessarily equivalent compounds include 2,6-dimethyl-4-methoxyphenol, 2,6-dimethyl-4-ethoxyphenol, 2,6-dimethyl-4-propoxyphenol, 2,6-diethyl - 4 - methoxyphenol, 2,6-diethyl-4-ethoxyphenol, 2,6 - diethyl-4-propoxyphenol, 2,6-dipropyl-4-methoxyphenol, 2,6-dipropyl-4-ethoxyphenol, 2,6-dipropyl-4-propoxyphenol, 2,6-dibutyl-4-methoxyphenol, 2,6-dibutyl-4-propoxyphenol, 2,6-dibutyl - 4 - propoxyphenol, 2-methyl-6-ethyl-4-methoxyphenol, 2-methyl-6 - ethyl - 4 - ethoxyphenol, 2 - methyl - 6 - ethyl - 4 - propoxyphenol, 2 - methyl - 6 - ethyl - 4 - butoxyphenol, 2-methyl-6-propyl-4-methoxyphenol, 2-methyl-6-propyl-4-ethoxyphenol, 2 - methyl-6-propyl-4-propoxyphenol, 2-propyl - 6 - butyl - 4 - methoxyphenoyl, 2-propyl-6-butyl-4-ethoxyphenol, 2-propyl-6-butyl-4-propoxyphenol, etc.

The invention will be further illustrated with respect to the following specific examples, which are given by way of illustration and not as limitations on the scope of this invention.

*Example I*

Glycerol was added to a dry gas-padded kettle. Potassium hydroxide was added and followed by the addition of propylene oxide in an amount sufficient to provide an intermediate condensation product having a molecular weight between 300 and 1,500.

Additional potassium hydroxide was added to the intermediate, followed by the addition of a further quantity of propylene oxide sufficient to provide a polyoxypropylene triol having a molecular weight of about 3,000. The crude reaction product was neutralized with oxalic acid in the substantial absence of air and the product was then filtered.

Portions of the thus-prepared samples were then tested for oxidation stability, both in the absence and in the presence of various inhibitors.

All samples were prepared in duplicate and were stored at 25° C. under an air blanket. Peroxide determinations were carried out at periodic intervals over a 22-day period to evaluate the inhibitors.

The results of the experiment are set forth in the following tables:

TABLE I.—INHIBITOR COMPOSITION

| Sample No. | Inhibitor | Inhibitor Conc., p.p.m. |
|---|---|---|
| 1A | Blank | |
| 1B | | |
| 2A | Triethylenediamine | 1,000 |
| 2B | | 1,000 |
| 3A | Triethylenediamine plus | 500 |
| 3B | Hydroquinone Monomethyl Ether | 500 |
| 4A | Triethylenediamine plus | 500 |
| 4B | 2,2'-methylene-bis(4-methyl-6-tertiary-butyl-phenol) | 500 |
| 5A | Triethylenediamine plus | 500 |
| 5B | Hydroquinone | 500 |
| 6A | 2-methyltriethylenediamine | 1,000 |
| 6B | | 1,000 |
| 7A | 2-methyltriethylenediamine plus | 500 |
| 7B | 2,6-ditertiary-butyl-para-cresol | 500 |
| 8A | 2-methyltriethylenediamine plus | 500 |
| 8B | Hydroquinone Monomethyl Ether | 500 |
| 9A | 2-ethyltriethylenediamine | 1,000 |
| 9B | | 1,000 |
| 10A | 2-ethyltriethylenediamine plus | 500 |
| 10B | 2,6-ditertiary-butyl-para-cresol | 500 |
| 11A | 2-ethyltriethylenediamine plus | 500 |
| 11B | Hydroquinone Monomethyl Ether | 500 |
| 12A | 2,6-ditertiary-butyl-para-cresol | 1,000 |
| 12B | | 1,000 |
| 13A | Hydroquinone Monomethyl Ether | 1,000 |
| 13B | | 1,000 |
| 14A | 2,2'-methylene-bis(4-methyl-6-tertiary-butyl-phenol) | 1,000 |
| 14B | | 1,000 |
| 15A | Hydroquinone | 1,000 |
| 15B | | 1,000 |

TABLE II.—3,000 M.W. TRIOL INHIBITOR TESTS

| Sample No. | Peroxide Content, p.p.m. as $O_2$ | | | | | | | Acid No. mg. KOH/g. | |
| | Initial 0 days | 4 days | 7 days | 11 days | 14 days | 18 days | 22 days | Initial | Final |
|---|---|---|---|---|---|---|---|---|---|
| 1A | 3.65 | 13.15 | 21.10 | 34.22 | 40.93 | 54.25 | 72.07 | 0.082 | 0.090 |
| 1B | 3.24 | 12.47 | 22.33 | 35.96 | 43.30 | 53.48 | 67.28 | | 0.119 |
| 2A | | 2.80 | 6.90 | 11.33 | 13.69 | 14.41 | 18.97 | | |
| 2B | | 2.50 | 7.05 | 11.22 | 13.57 | 13.80 | 14.45 | | 0.0708 |
| 3A | | 1.05 | 1.15 | 1.45 | 1.79 | 1.54 | 1.66 | | |
| 3B | | 1.19 | 1.19 | 1.49 | 1.39 | 1.26 | 1.39 | | |
| 4A | | 1.02 | 1.12 | 1.50 | 1.72 | 0.97 | 1.57 | | 0.083 |
| 4B | | 1.01 | 1.06 | 1.24 | 1.38 | 0.87 | 1.16 | | 0.0878 |
| 5A | | 2.03 | 4.98 | 7.69 | 9.61 | 14.17 | 18.60 | | |
| 5B | | 2.02 | 4.04 | 6.20 | 8.82 | 12.33 | 16.90 | | 0.085 |
| 6A | | 2.55 | 3.81 | 4.34 | 4.11 | 4.10 | 4.59 | | |
| 6B | | 2.48 | 3.24 | 3.12 | 3.96 | 3.01 | 3.39 | | 0.0836 |
| 7A | | 2.02 | 2.14 | 2.42 | 2.22 | 1.94 | 2.22 | | |
| 7B | | 1.83 | 2.09 | 2.00 | 2.24 | 1.74 | 2.11 | | |
| 8A | | 1.93 | 1.97 | 2.63 | 2.36 | 2.39 | 2.41 | | |
| 8B | | 1.83 | 2.02 | 2.23 | 2.20 | 2.20 | 2.39 | | |
| 9A | | 5.27 | 10.30 | 15.90 | 16.67 | 19.23 | 19.38 | | |
| 9B | | 5.72 | 7.80 | 9.48 | 10.18 | 13.24 | 19.19 | | |
| 10A | | 1.73 | 2.39 | 2.18 | 2.10 | 2.64 | 2.39 | | |
| 10B | | 1.87 | 1.93 | 1.91 | 2.13 | 1.52 | 1.89 | | |
| 11A | | 1.82 | 2.06 | 2.17 | 2.44 | 2.54 | 2.49 | | |
| 11B | | 1.83 | 1.89 | 2.13 | 2.09 | 2.25 | 2.44 | | 0.8850 |
| 12A | | 2.15 | 3.21 | 3.83 | 3.59 | 3.85 | 4.61 | | |
| 12B | | 2.39 | 3.18 | 3.83 | 3.93 | 3.64 | 3.98 | | |
| 13A | | 2.25 | 2.82 | 3.29 | 3.73 | 3.80 | 4.13 | | |
| 13B | | 2.56 | 2.76 | 3.19 | 3.35 | 3.62 | 3.37 | | 0.092 |
| 14A | | 1.70 | 2.11 | 2.32 | 2.60 | 3.29 | 3.37 | | |
| 14B | | 1.58 | 2.17 | 2.12 | 2.49 | 2.58 | 3.02 | | 0.0953 |
| 15A | | 1.97 | 2.76 | 2.87 | 3.33 | 3.43 | 3.74 | | |
| 15B | | 1.54 | 2.18 | 2.20 | 2.82 | 2.54 | 2.80 | | |

As will be seen from the foregoing data, the use of triethylenediamine, methyltriethylenediamine and ethyltriethylenediamine significantly improved the resistance of the uninhibited triol to oxidative deterioration. It is to be observed further that methyltriethylenediamine is superior to either triethylenediamine or ethyltriethylenediamine in this regard and was essentially equivalent to the results obtainable with the conventional stabilizers.

It is to be observed further that the use of a conventional phenolic stabilizer in admixture with the triethylenediamines gave results which were equivalent to or superior to the results obtainable with conventional phenolic stabilizers. Still further, it will be observed that superior results were obtained when triethylenediamine was utilized in combination with hydroxymonomethyl- or hydroquinone monomethyl ether or 2,2'-methylene-bis(4-methyl-6-tertiary-butylphenol). It will be observed that for methyltriethylenediamine the best results are obtained with a mixture of methyltriethylenediamine with ditertiary-butylcresol and that this was likewise the case with ethyltriethylenediamine.

*Example II*

That the results obtained in the foregoing experiment were truly surprising is illustrated by the results that were obtained with lower molecular weight polyoxypropylene triols or polyoxyethylenediamines which were prepared and tested in the manner described above in Example I. The results obtained when attempting to stabilize a propylene oxide condensate of glycerol having a molecular weight of 400 and the results obtained in attempting to stabilize an ethylene oxide condensate of ethylene glycol having a molecular weight of about 6,000 are illustrated in the following tables.

It is pertinent to observe from the samples that with the polyoxypropylene triol the triethylenediamine promoted rather than retarded oxidative deterioration.

*Example III*

As another example, a propylene oxide triol prepared by initially reacting trimethylolpropane with an amount of propylene oxide sufficient to provide an intermediate having a molecular weight of about 2,700 which was further reacted with an amount of ethylene oxide sufficient to provide a final reaction product having a molecular weight of about 3,000 was prepared and tested in accordance with the method described above in Example I. The results obtained are summarized in the following table:

TABLE V.—3,000 M.W. TRIOL INHIBITOR TEST

| Inhibitor | Inhibitor Conc., p.p.m. | Peroxide Content, p.p.m. as $O_2$ | | | | | |
|---|---|---|---|---|---|---|---|
| | | Initial 0 days | 2 days | 6 days | 9 days | 13 days | 17 days |
| Blank | | 9.05 | 13.50 | 18.49 | 23.38 | 40.69 | 28.15 |
| 2,6-Ditertiarybutyl-para-cresol | 1,000 | 6.39 | 6.74 | 7.80 | 7.61 | 9.00 | 9.26 |
| Triethylenediamine | 1,000 | 6.34 | 7.56 | 7.69 | 8.89 | 13.64 | 16.16 |

As will be observed, triethylenediamine was an effective oxidation inhibitor, although not quite as effective as ditertiary-butyl-para-cresol.

*Example IV*

By way of contrast, samples of a polyethylene glycol having a molecular weight of about 400 were tested at concentrations of 200 and 1,000 p.p.m. triethylenediamine. It was found that the triethylenediamine did not prevent an increase in sulfuric acid discoloration of samples held at 80° C. for 3 days and 8 days. By way of contrast, ditertiary-butyl-para-cresol was effective with this material.

*Example V*

Diethylene glycol containing about 200 p.p.m. triethylenediamine was reacted with a mixture of maleic and phthalic acid and propylene oxide. The resulting resin gelled. When the experiment was repeated using ditertiary-butyl-para-cresol, a satisfactory polyester resin was obtained.

TABLE III.—400 M.W. TRIOL INHIBITOR TEST

| Inhibitor | Inhibitor Conc., p.p.m. | Peroxide Content, p.p.m. as $O_2$ | | | | | Acid No. mg. KOH/g. | |
|---|---|---|---|---|---|---|---|---|
| | | Initial 0 days | 2 days | 6 days | 9 days | 13 days | Initial | Final |
| Blank | | 16.81 | 15.83 | 7.07 | 10.53 | 11.68 | 0.04 | 0.36 |
| Triethylenediamine | 500 | 12.78 | 12.49 | 30.79 | 13.59 *(15.17) | 46.25 | | 0.38 |
| Do | 500 | 10.85 | 9.85 | 4.46 | 8.14 *(8.58) | 16.02 | | 0.27 |

*Original sample stirred before sampling.

TABLE IV.—6000 M.W. DIOL INHIBITOR TEST RESULTS, VISCOSITY, CS.

| Inhibitor | Inhibitor Conc., p.p.m. | 0 hrs. | 1 hr. | 2 hrs. | 3 hrs. | 4 hrs. | 5 hrs. | 6 hrs. | 7 hrs. |
|---|---|---|---|---|---|---|---|---|---|
| Blank | | 781.6 | 768.5 | 746.5 | 674.0 | 612.9 | 572.6 | 537.6 | |
| Do | | 783.5 | 751.9 | 672.6 | 609.1 | 572.4 | 545.9 | 519.6 | |
| Triethylenediamine | 500 | 773.5 | 706.9 | 654.5 | 620.7 | 572.8 | 557.3 | 543.4 | |
| Do | 500 | 776.8 | 711.0 | 667.9 | 596.8 | 540.1 | 506.3 | 463.1 | 436.3 |
| Hydroquinone Monomethyl Ether | 500 | 779.0 | 780.5 | 779.6 | 779.4 | 775.8 | 777.8 | 781.7 | 787.3 |
| Do | 500 | 779.6 | 779.9 | 779.8 | 777.4 | 778.2 | 777.7 | 782.5 | 786.6 |

Example VI

About 500 p.p.m. of triethylenediamine was added to methacrylic acid. Polymerization occurred within about one-half hour when the mixture was heated at a temperature of 110° to 120° C. By way of contrast, hindered phenolic inhibitors are effective in preventing or delaying polymerization of methacrylic acid under such conditions.

Having thus described our invention, what is claimed is:

1. A stabilized polyether triol comprising a polyether triol having a molecular weight within the range of about 2,000 to about 5,000 prepared by the alkoxylation of a triol selected from the group consisting of glycerol and trimethylolpropane with about 80 to about 100 mol percent of propylene oxide and, correspondingly from about 20 to 0 mol percent of ethylene oxide having incorporated therewith a stabilizing amount of a compound selected from the group consisting of triethylenediamine, 2-methyltriethylenediamine and 2-ethyltriethylenediamine.

2. The stabilized polyether triol of claim 1 wherein the polyether triol is a polypropylene oxide condensate of glycerol.

3. A stabilized polyether triol comprising a polyether triol having a molecular weight within the range of about 2,000 to about 5,000 prepared by the alkoxylation of a triol selected from the group consisting of trimethylolpropane and glycerol with about 80 to about 100 mol percent of propylene oxide and, correspondingly, from about 20 to 0 mol percent of ethylene oxide having incorporated therewith 0.05 to about 5 wt. percent of a stabilizing composition, said stabilizing composition consisting essentially of 25 to 75 wt. percent of a phenolic oxidation inhibitor and, correspondingly, from about 75 to about 25 wt. percent of a compound selected from the group consisting of triethylenediamine, 2-methyltriethylenediamine, 2-ethyltriethylenediamine, and mixtures thereof.

4. The stabilized polyether triol of claim 3 wherein the phenolic oxidation inhibitor is 2,2'-methylene-bis(4-methyl-6-tertiary-butylphenol) and wherein the said compound is triethylenediamine.

5. The stabilized polyether triol of claim 3 wherein the phenolic oxidation inhibitor is 2,6-ditertiary-butyl-para-cresol and the said compound is 2-methyltriethylenediamine.

6. The stabilized polyether triol of claim 3 wherein the phenolic oxidation inhibitor is hydroquinone monomethylether and the said compound is 2-methyltriethylenediamine.

7. The stabilized polyether triol of claim 3 wherein the phenolic oxidation inhibitor is hydroquinone monomethylether and the said compound is 2-ethyltriethylenediamine.

8. The stabilized polyether triol of claim 3 wherein the phenolic oxidation inhibitor is hydroquinone monomethylether and the said compound is triethylenediamine.

References Cited

UNITED STATES PATENTS

| | | | |
|---|---|---|---|
| 2,481,278 | 9/1949 | Ballard et al. | |
| 2,641,614 | 6/1953 | Britton et al. | |
| 2,687,378 | 8/1954 | Goldschmidt et al. | 260—611.5 X |
| 3,164,558 | 1/1965 | Eichhorn | 260—77.5 X |
| 3,169,934 | 2/1965 | Dennett et al. | 260—77.5 X |
| 3,179,606 | 4/1965 | Prescott et al. | 260—77.5 X |

LEON ZITVER, *Primary Examiner.*

BERNARD HELFIN, *Assistant Examiner.*